(12) United States Patent
Mereu et al.

(10) Patent No.: US 9,396,568 B2
(45) Date of Patent: Jul. 19, 2016

(54) SYSTEM AND METHOD TO REPLACE COMPS WITH ASSETS

(71) Applicant: Corel Corporation, Ottawa (CA)

(72) Inventors: Stephen Mereu, Carp (CA); Paul Legomski, Ottawa (CA); Neville Ko, Nepean (CA)

(73) Assignee: Corel Corporation, Ottawa (CA)

( * ) Notice: Subject to any disclaimer, the term of this patent is extended or adjusted under 35 U.S.C. 154(b) by 110 days.

(21) Appl. No.: 13/794,980

(22) Filed: Mar. 12, 2013

(65) Prior Publication Data

US 2014/0267379 A1 Sep. 18, 2014

(51) Int. Cl.
*G06T 11/60* (2006.01)
*G06T 19/00* (2011.01)
*G06F 17/30* (2006.01)
*H04L 29/06* (2006.01)

(52) U.S. Cl.
CPC .......... *G06T 11/60* (2013.01); *G06F 17/30563* (2013.01); *G06F 17/30592* (2013.01); *G06T 19/00* (2013.01); *H04L 29/06* (2013.01)

(58) Field of Classification Search
CPC .............. G06T 19/00; G06F 17/30592; G06F 17/30563; H04L 29/06
USPC ............. 345/619; 709/218, 999.01; 707/602; 348/14.12
See application file for complete search history.

(56) References Cited

U.S. PATENT DOCUMENTS

| | | | | |
|---|---|---|---|---|
| 2001/0019423 | A1* | 9/2001 | Hirai | 358/1.15 |
| 2004/0215625 | A1* | 10/2004 | Svendsen et al. | 707/10 |
| 2005/0052469 | A1* | 3/2005 | Crosby et al. | 345/619 |
| 2006/0044599 | A1* | 3/2006 | Lipowitz | G06Q 30/0641 358/1.15 |
| 2012/0245848 | A1* | 9/2012 | Spindler et al. | 701/532 |

* cited by examiner

*Primary Examiner* — Matthew Salvucci
(74) *Attorney, Agent, or Firm* — Rosenberg, Klein & Lee

(57) ABSTRACT

A method includes the steps of: providing a computer readable non-transitory storage medium including computer readable code configured to run on a computer and to perform a process to replace a comp with a corresponding asset; running the computer readable code on the computer; selecting the comp to replace with the corresponding asset; retrieving by computer an asset file of the corresponding asset from an asset server based on an identification code of the comp; replacing by computer the comp with the asset; and redrawing by computer the drawing including the corresponding asset in place of the comp. A system to perform the method is also described.

10 Claims, 6 Drawing Sheets

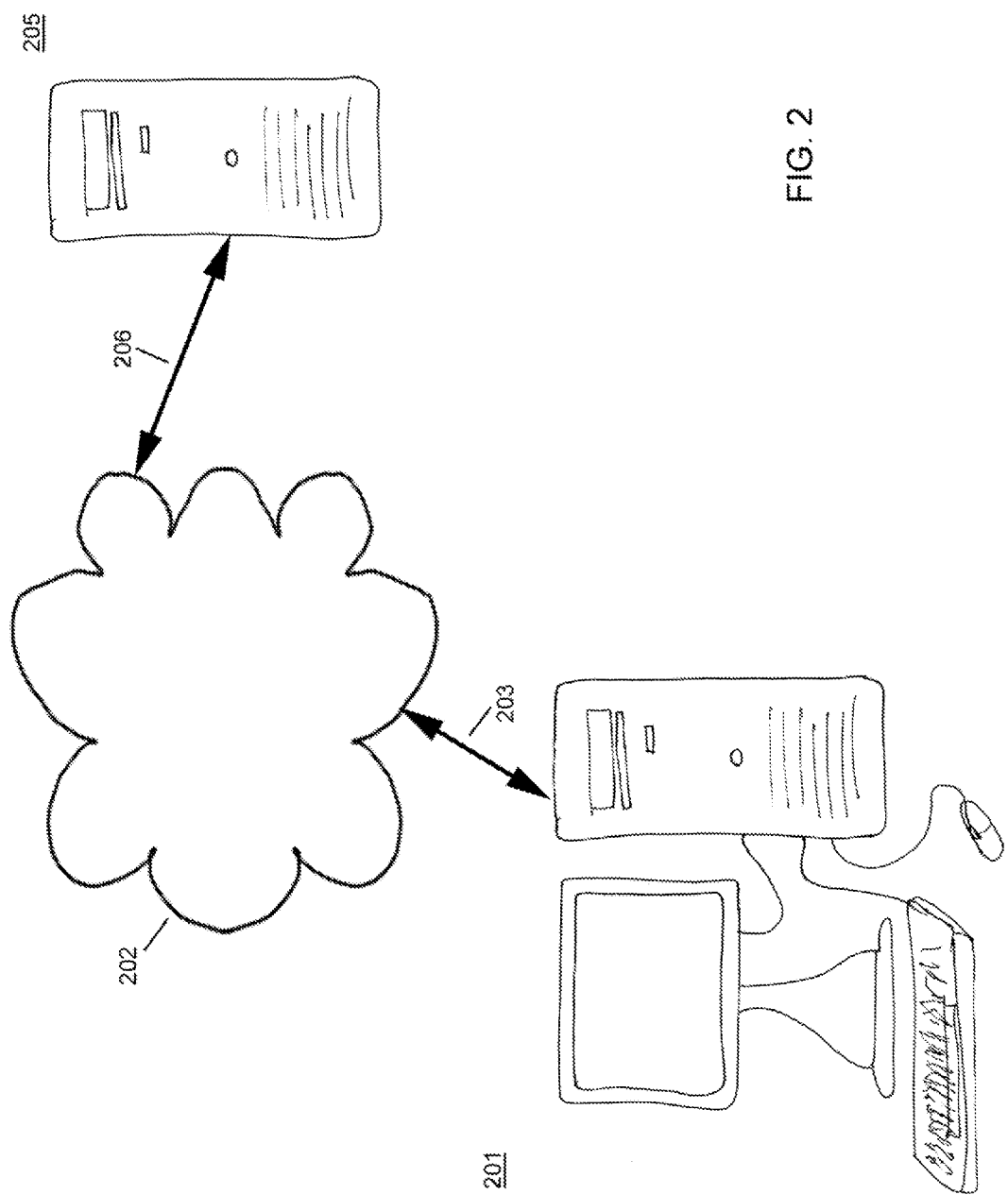

SYSTEM AND METHOD TO REPLACE COMPS WITH ASSETS

FIELD OF THE INVENTION

The invention relates to the use of comps in computer graphics and more particularly to a system and method to efficiently replace comps with assets.

BACKGROUND OF THE INVENTION

Images including digital photographs and computer drawings and graphics are widely available for use in computer drawings. While some images are in the public domain for download and use at will, other images are available for purchase. A relatively low resolution version of an image or vector drawing for sale is called a "comp". Some comps also carry a watermark of an image sales company.

Following a preview by comp, a user wishing to purchase the image represented by the comp, needs to perform several actions before gaining access to the image file of the actual full resolution image or of a scalable vector image. To buy an image represented by a comp, typically, the user opens a web browser, navigates to a stock image site, logs on to the stock image site, selects the desired image for purchase, places the image in an online digital shopping cart, selects checkout, enters payment information for the image, and downloads the purchased image. Following the download, the user then opens a computer application program (e.g. a graphics or drawing computer program), opens their drawing, finds and imports the purchased file, manually replaces the comp with the imported image and reapplies any transformations that had been done to the comp to the imported image and then continues with their drawing.

The problem is that to replace a comp with the corresponding purchased asset by prior art methods, the user is forced to break their train of thought which disrupts their creative process.

SUMMARY OF THE INVENTION

There is a need for a streamlined system and method for obtaining asset files for comps which is less distracting to the creative process.

According to one aspect, the invention features a method which includes the steps of: providing a computer readable non-transitory storage medium including computer readable code configured to run on a computer and to perform a process to replace a comp with a corresponding asset (e.g. image, vector drawing); running the computer readable code on the computer; selecting the comp to replace with the corresponding asset; retrieving by computer an asset file of the corresponding asset from an asset server based on an identification code of the comp; replacing by computer the comp with the asset; and redrawing by computer the drawing including the corresponding asset in place of the comp.

In one embodiment, the step of redrawing by computer includes the step of redrawing by computer the drawing including the corresponding asset in place of the comp and applying by computer to the corresponding asset one or more properties previously applied to the comp.

In another embodiment, the step of applying by computer one or more properties previously applied to the comp includes applying a property selected from the group of properties consisting of size, scale, rotation, transparency fill, and enveloping border.

In yet another embodiment, the comp includes a low resolution bit mapped image.

In yet another embodiment, the corresponding asset includes a high resolution bit mapped image.

In yet another embodiment, the corresponding asset includes a vector graphic.

In yet another embodiment, the process further includes the step of communicating with a subscription server to establish a rights authorization before the step of retrieving by computer an asset file of the corresponding asset.

In yet another embodiment, the identification code includes an identification number.

According to another aspect, the invention features a system which includes a computer readable code configured to run on a local computer. The system includes a user entry device and a core program configured to perform a process to replace a comp with a corresponding asset (e.g. image, vector drawing, etc.). The core program is configured to run the computer readable code on the local computer; to select the comp to replace with the corresponding asset; to retrieve by computer an asset file of the corresponding asset from an asset server based on an identification code of the comp; to replace by computer the comp with the asset; and to redraw by computer the drawing including the corresponding asset in place of the comp.

In one embodiment, the core program is further configured to apply by computer to the corresponding asset one or more properties previously applied to the comp.

According to another aspect, the invention features a method which includes the steps of: providing a computer readable non-transitory storage medium including computer readable code configured to run on a computer and to perform a process to replace a plurality of comps with a plurality of corresponding assets; running the computer readable code on the computer; selecting the plurality of comps to replace with the plurality of corresponding assets; retrieving by computer a plurality of asset files of the corresponding asset from an asset server based on an identification code of each comp of the plurality of comps; replacing by computer the plurality of comps with the plurality of corresponding assets; and redrawing by computer the drawing including the plurality of corresponding assets in place of the comp.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 2 shows a block diagram of one exemplary system suitable for performing the processes described herein;

DETAILED DESCRIPTION

As described hereinabove, a user of a computer drawing typically tests assets (e.g. images, vector drawing, etc.) for purchase in their creative works by placing a free low resolution bit mapped version of an asset, such as an asset available for purchase, into their work (also referred to a comp). A comp is used to preview an asset. An asset corresponding to the comp can be, for example, a relatively high resolution image, or vector drawing. The creative work is typically a computer graphic file work-in-progress, such as a computer drawing. In some computer graphics and computer drawing programs, the comp can be scaled, rotated, stretched, or otherwise modified as part of the trial process.

Figure 1A:
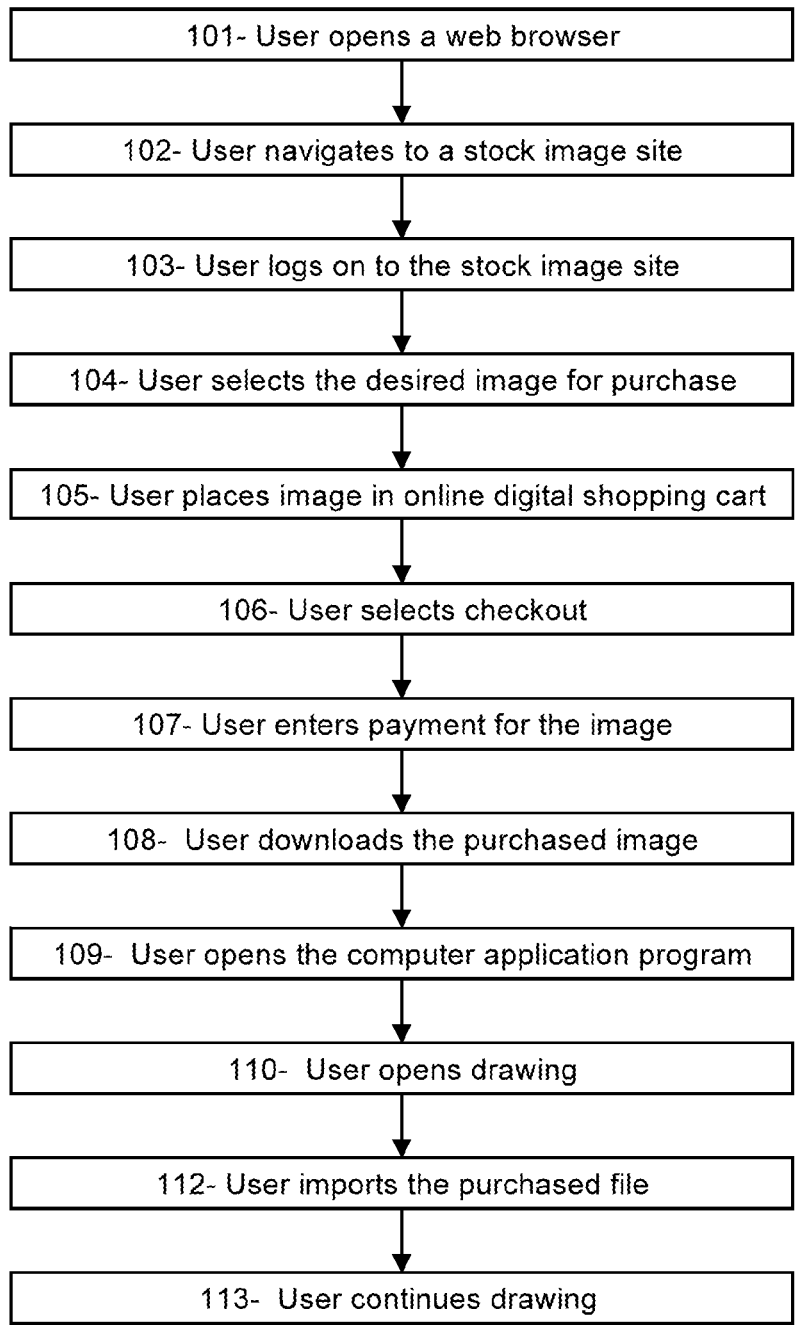
FIG. 1A shows a block diagram of user steps to replace a selected comp with a corresponding purchased asset according to the prior art.
Figure 1B:
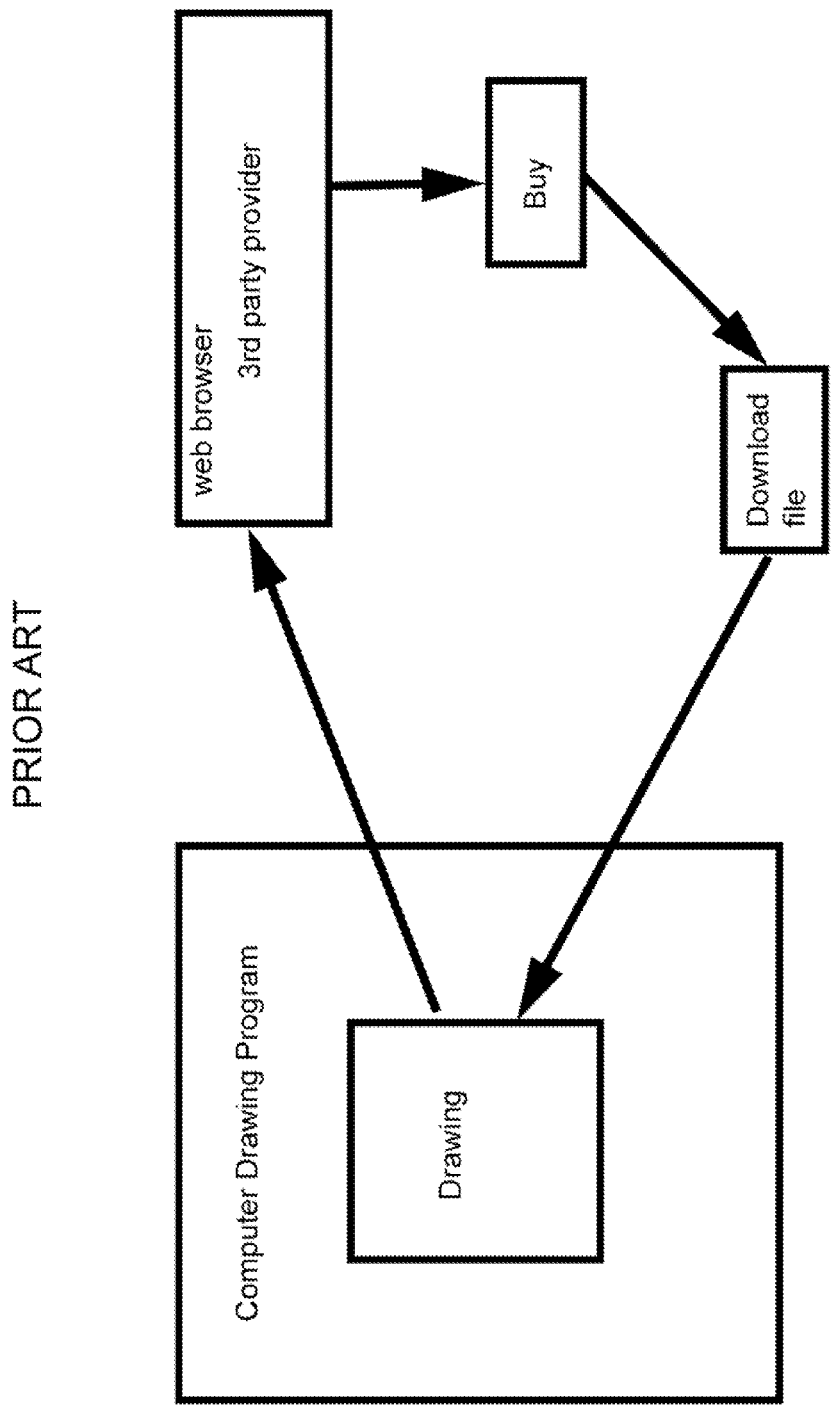
FIG. 1B shows a block diagram of a process flow according to FIG. 1A.

FIG. 1A shows a block diagram of the user steps which are typically required to replace a selected comp with a corresponding purchased asset. The steps to purchase an asset from a comp available online typically proceed as follows: 101) the user opens a web browser, 102) the user navigates to a stock image site, 103) the user logs on to the stock image site, 104) the user selects the desired asset for purchase, 105) the user places the asset in an online digital shopping cart, 106) the user selects checkout, 107) the user enters payment for the asset, and 108) the user downloads the purchased asset. Following the download, 109) the user opens the computer application program (e.g. a graphics or drawing computer program), 110) opens their drawing, finds and 112) the user imports the purchased file and then 113) the user continues with their drawing by placing and resizing, rotating, scaling, applying properties, etc., to the newly placed image that replaces the comp. FIG. 1B shows a block diagram of the process to replace a comp with a corresponding asset file according to the prior art.

FIG. 2 shows a block diagram of one exemplary computer system suitable for performing the processes described herein. A computer, typically a local computer 201 (e.g. a client computer) is connected via any suitable data connection 203 (e.g. Cable modem, WiFi, WiMAX, FioS, DSL, local or wide area Ethernet network connections, etc.) typically via an Internet connection, to any suitable cloud 202 (typically the Internet). A computer server configured as an image server 205 is also connected to the cloud 202 via any suitable connection 206. The computers, local computer 201, and image server 205, need not be of the same type computer.

In one embodiment, an improved system and method offers comps for purchase under a subscription model. The user of a computer drawing program can log into the application program before beginning a creative drawing session. The logon, generally involving a brief exchange with a subscription server, ascertains the user's membership or subscription level of the application program. The user can access comps through a selection process, such as can be offered by searching by topic or key word through an asset server. The user can test the appearance of a comp in a drawing as before. When the user decides to use a comp and to replace it with the actual asset, the replacement can be accomplished by one user instruction, such as for example an instruction or command selected from a menu opened by a mouse click. While working with comps from a dedicated asset/comp server, the downloading of a comp to a user's machine for use in a document is generally quicker than the downloading of an asset since they are usually smaller in size.

A comp being tested in a computer drawing can typically be manipulated for scaling, size, stretching, rotation, application of certain object properties (e.g. transparency fill, and enveloping border), styles, etc. Using the process described herein, the computer can automatically and without further user interaction apply any such scaling, size, stretching, rotation, application of certain object properties, styles, etc. which was previously applied to the comp, as the corresponding asset is inserted by the computer into a drawing in place of a comp.

The process makes use of a dedicated asset server which stores for distribution the asset files for the comps. The comps and corresponding asset files are linked by a database of asset ID codes such as can be defined by ID numbers and/or ID characters. The comp includes an ID code (e.g. an ID number). Information such as user defined scaling, size, stretching, rotation, applying properties, etc. can be stored within the drawing and/or drawing file by the computer application program and such information is generally not stored at a remote asset server. Generally, the information stored in the database about the comp file is used to correlate the comp file to a corresponding full asset file (e.g. a corresponding high resolution bit mapped image or a corresponding vector graphic file).

Figure 3:
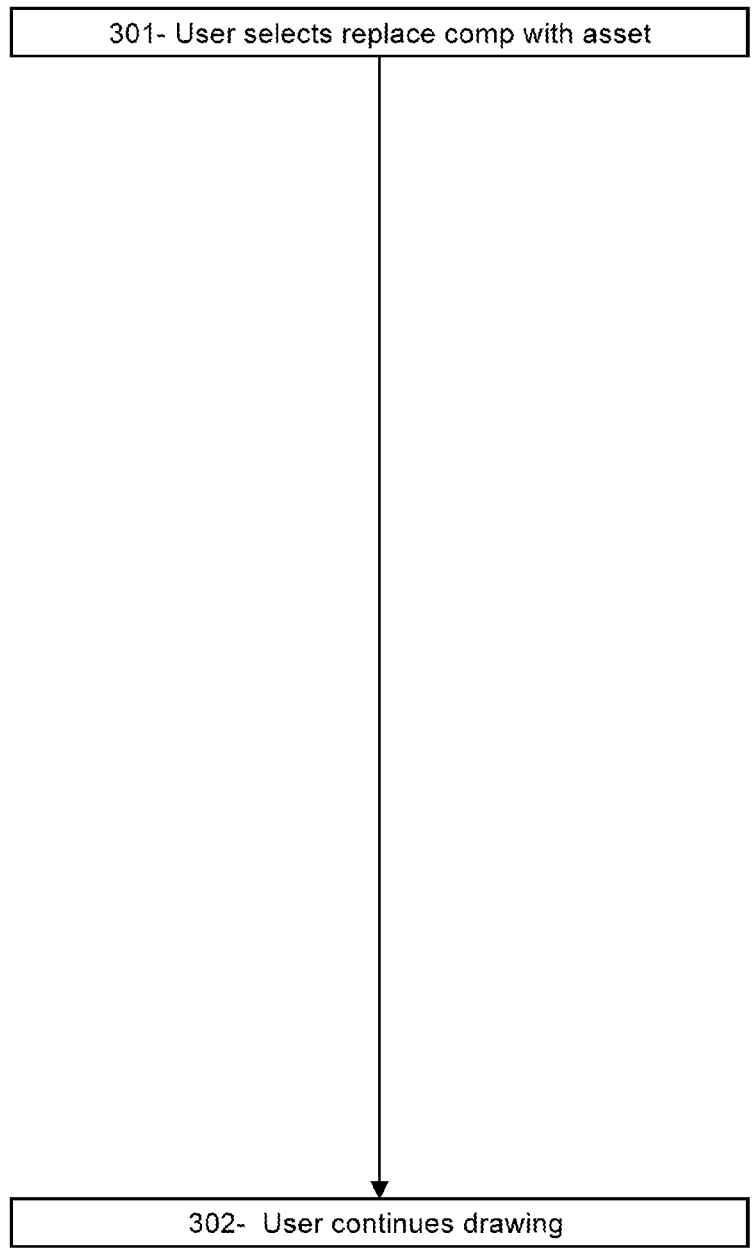
FIG. 3 is a block diagram showing one embodiment of user steps to replace a selected comp with a corresponding purchased asset according to the inventive process.

FIG. 3 shows the streamlined steps from a user's perspective, according to the process described herein, which can be used to replace a selected comp with a paid for asset. The steps include: 301) select replace comp; 302) user continues editing the drawing. According to the user steps of FIG. 3, the creative process can continue relatively undisturbed following the replacement of a comp. In step 301, the user selects the comp, such as by a mouser over, followed by a mouse right click. Then, for example, from an item of a drop down menu, the user selects replace comp with the actual asset. The computer program causes the computer to access the asset server, presents its credentials (e.g. access by a member having rights to the asset associated with the comp), and the computer then (transparent to the user) downloads the asset file, stores the asset file on the local computer, replaces the comp with the asset, and applies the same scaling, size, stretching, rotation, applying properties, etc., as were applied to the comp. Thus, the process both retrieves a full asset file for the comp as well as re-applies any customization of shape and properties (e.g. styles) to the asset which replaces the comp at the same position in the drawing.

Figure 4:
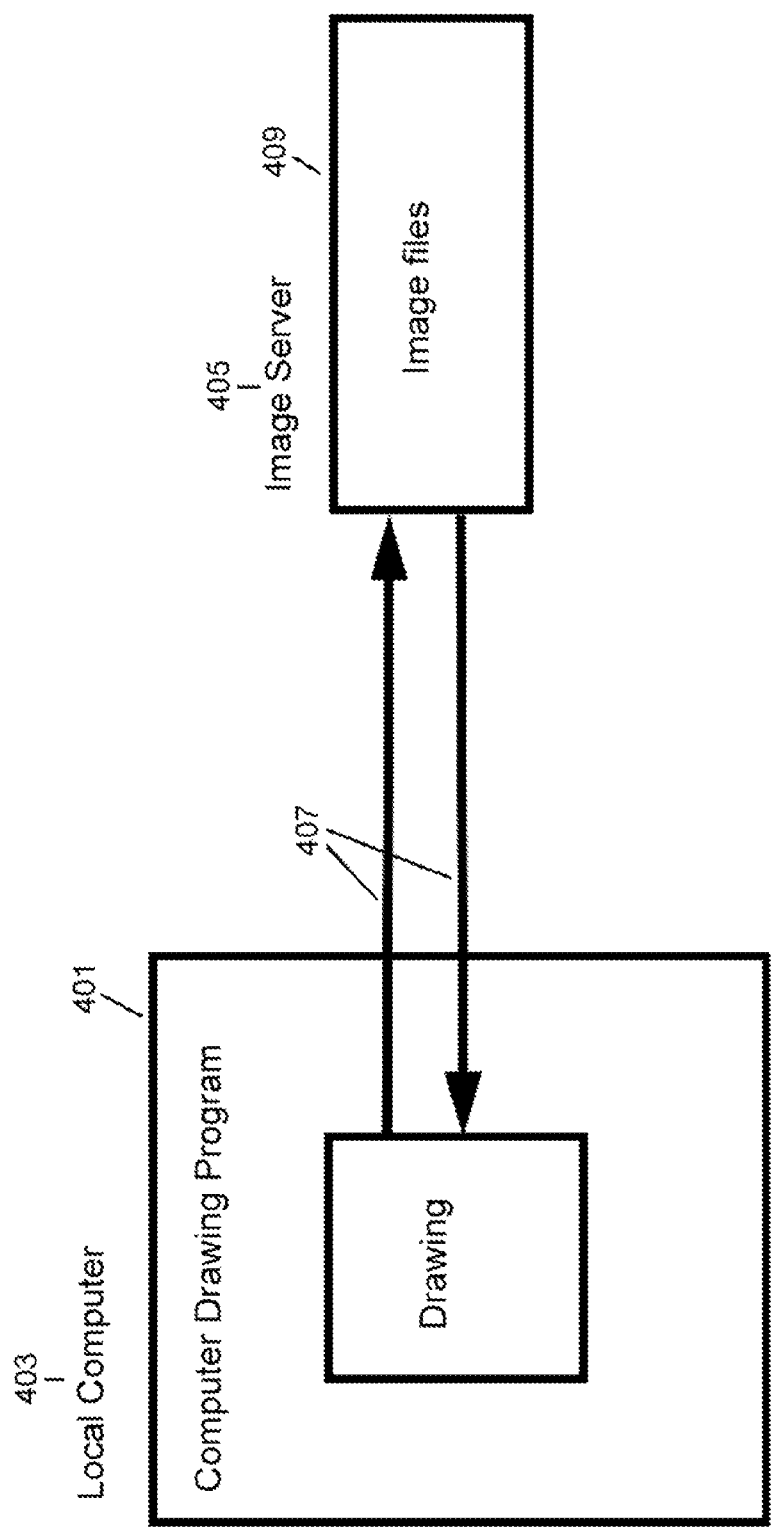
FIG. 4 shows a block diagram of a process flow for the user steps of FIG. 3.

FIG. 4 shows a block diagram of the process to replace a comp using the process described herein. The computer drawing program 401 running on a local computer 403, in response to a request to replace a comp with the corresponding asset file, communicatively couples to the asset server 405 via a network connection 407, and downloads the asset file from the indexed asset files 409 stored on the asset server 405 via the same network connection 407. While the data flow over network connection 407 is represented in FIG. 4 as two lines with arrows, typically a network connection 407 is present as a hardwired cable or optical (e.g. fiber optic cable) connection.

Figure 5:
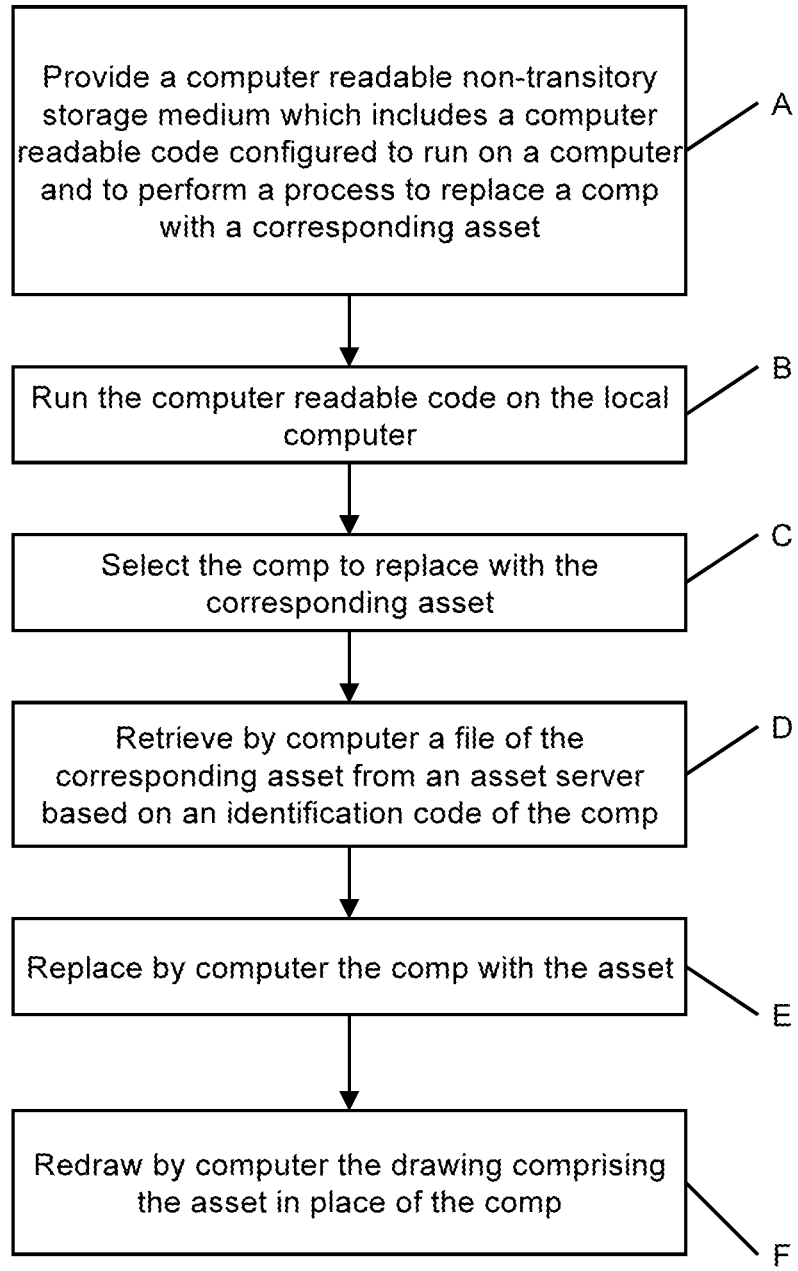
FIG. 5 shows a block diagram of exemplary process steps.

FIG. 5 shows, for one embodiment of the process described herein, a block diagram of process steps: A) provide a computer readable non-transitory storage medium which includes a computer readable code configured to run on a computer and to perform a process to replace a comp with a corresponding asset; B) run the computer readable code on the local computer; C) select the comp to replace with the corresponding asset; D) retrieve by computer an asset file of the corresponding asset from an asset server based on an identification code of the comp; E) replace by computer the comp with the asset; and F) redraw by computer the drawing comprising the asset in place of the comp. Optional step G) apply by computer to the asset one or more properties previously applied to the comp is not shown in FIG. 5.

Similarly, in another embodiment, the process can be used to replace a plurality of comps by the following steps: A) provide a computer readable non-transitory storage medium including computer readable code configured to run on a computer and to perform a process to replace a plurality of comps with a plurality of corresponding assets; B) run the computer readable code on the computer; C) select the plurality of comps to replace with the plurality of corresponding assets; D) retrieve by computer a plurality of asset files of the corresponding asset from an asset server based on an identification code of each comp of the plurality of comps; E) replace by computer the plurality of comps with the plurality of corresponding assets; and F) redraw by computer the drawing comprising the plurality of corresponding assets in place of the comp.

Example: An asset server contains a database of digital assets (images, vector drawings, etc.), metadata that describes the assets (e.g. a unique ID, keywords, asset type, etc.), thumbnail representations for the assets as well as comp representations for the assets. A user can browse/search the asset database using a program designed to perform this browse/search function and present the results to the user in a GUI. One such program is the Corel CONNECT™ program available from the Corel Corporation of Ottawa, Canada. If the user has access rights to an asset the asset will be presented in the browse/search tool with a regular thumbnail. If they do not have access rights to an asset, the asset will be presented in the browse/search tool with a watermarked thumbnail. This difference indicates to the user which assets they have rights to and which they do not. For example, a user with a standard membership may have access rights to an image called dog.jpg, but not to one called car.jpg since it is only available to users with a premium membership. The thumbnail for the dog.jpg asset will be a regular thumbnail whereas the thumbnail for the car.jpg will be a watermarked thumbnail. The user can drag the asset to their application to start to use it. If the user has access to the dragged asset (e.g. image, vector drawing, etc.) then the actual asset is inserted into the document. If the user does not have access to the dragged asset, then a watermarked comp representation of the asset is inserted into the document. The user can then place the comp in their document and modify its properties (e.g. size, border envelope, transparency, etc.). The comp object in the document maintains the unique asset ID of the actual asset that it represents. If at a later point, the user's access rights to the asset are now granted, (e.g. they purchase a premium membership to have access to premium content), then they can elect to replace the comp with the actual asset. To do this, the user will select the comp and then select the "Replace comp" option. This option can be found in a context menu of the comp, on a toolbar, or some other place where command options are available. The replace comp action will then take the unique asset ID that was stored with the comp and communicate with the asset server to download the actual asset with that ID. Before downloading, the asset server verifies that the user has the access rights to the asset. If they do, then the asset is downloaded to the user's machine. Once the download is complete, the drawing program will insert the asset at the same location and size as the comp in the document. It will also extract all the properties that are applicable from the comp and apply them to the asset in the document. These can include, but are not limited to, the border envelope of the asset, the transparency applied to the asset, etc. Once this is finished, the comp object is removed from the document and the comp replacement is complete. To the user it was a simple "push of the button" operation.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A method comprising the steps of:
providing a user interface allowing a user to select a first digital asset from a plurality of second digital assets wherein each second digital asset relates an original asset of a plurality of original assets stored within a remote computer and includes an indication visually depicting to the user their access rights to the original asset;
determining whether the user has access rights to the original asset associated with the selected first digital asset; wherein
upon a positive determination with respect to the user's access rights receiving and storing the original asset associated with the selected first digital asset in a digital memory; and
upon a negative determination with respect to the user's access rights:
receiving data and storing within the digital memory comprising the selected first digital asset and identity data relating to the original asset extracted from a database upon an asset server; and
storing within the digital memory in association with the first digital asset and an item of digital content the user has inserted the first digital asset into asset modification data relating to any asset modifications made by the user to the first digital asset within the digital content;
determining whether the user's access rights to the original asset associated with the selected first digital asset have changed; wherein
upon a determination that the user now has access rights to the original asset associated with the selected first digital asset:
receiving and storing the original asset associated with the selected first digital asset in the digital memory;
applying any asset modifications the user has made based upon the asset modification data stored in the digital memory in association with the first digital asset; and
replacing the modified first digital asset with the modified original asset; and
determining whether the user's access rights to the original asset associated with the selected first digital asset have changed further comprises:
upon a determination that the user has now lost access rights to the original asset associated with the selected first digital asset:
receiving and storing the first digital asset associated with the original asset in the digital memory;
applying any asset modifications the user has made to the original asset to the first digital asset; and
replacing the original asset with the modified first digital asset.

2. The method of claim 1, wherein determining whether the user's access rights to the original asset associated with the selected first digital asset have changed is at least one of automatically performed and initiated by an activity of the user with an online resource related to at least the access right of the original asset.

3. The method of claim 1, wherein the asset modification data relating to any asset modifications relates to at least one of said step of applying by computer one or more properties previously applied to said asset comprises applying a property selected from the group of properties consisting of size, scale, non-linear scaling, rotation, transparency fill, application of object properties, and enveloping border.

4. The method of claim 1, wherein the first digital asset comprises at least one of a low resolution bit mapped asset, a thumbnail relating to the asset, a watermarked thumbnail relating to the asset, and a watermarked asset.

5. The method of claim 1, wherein the asset data relates to at least one of a high resolution bit mapped asset and a vector graphics asset.

6. The method of claim 1, wherein the method is performed by a software application which at least one of communicates with and forms a predetermined portion of a graphics application employed by the user to generate the digital content.

7. A non-transitory tangible computer readable medium encoding a computer process for execution by a processor, the computer process comprising:
   providing a user interface allowing a user to select a first digital asset from a plurality of second digital assets wherein each second digital asset relates an original asset of a plurality of original assets and include an indication visually depicting to the user their access rights to the original asset;
   determining whether the user has access rights to the original asset associated with the selected first digital asset; wherein
      upon a positive determination with respect to the user's access rights receiving and storing the original asset associated with the selected first digital asset in a digital memory; and
      upon a negative determination with respect to the user's access rights:
         receiving data and storing within the digital memory comprising the selected first digital asset and identity data relating to the original asset extracted from a database upon an asset server; and
         storing within the digital memory in association with the first digital asset and an item of digital content the user has inserted the first digital asset into asset modification data relating to any asset modifications made by the user to the first digital asset within the digital content;
   determining whether the user's access rights to the original asset associated with the selected first digital asset have changed; wherein
      upon a determination that the user now has access rights to the original asset associated with the selected first digital asset:
         receiving and storing the original asset associated with the selected first digital asset in the digital memory;
         applying any asset modifications the user has made based upon the asset modification data stored in the digital memory in association with the first digital asset; and
         replacing the modified first digital asset with the modified original asset; and
   determining whether the user's access rights to the original asset associated with the selected first digital asset have changed further comprises;
      upon a determination that the user has now lost access rights to the original asset associated with the selected first digital asset;
      receiving and storing the first digital asset associated with the original asset in the digital memory;
      applying any asset modifications the user has made to the original asset to the first digital asset; and
      replacing the original asset with the modified first digital asset.

8. The non-transitory tangible computer readable medium encoding a computer process for execution by a processor according to claim 7, wherein determining whether the user's access rights to the original asset associated with the selected first digital asset have changed is at least one of automatically performed and initiated by an activity of the user with an online resource related to at least the access right of the original asset.

9. The non-transitory tangible computer readable medium encoding a computer process for execution by a processor according to claim 7, wherein the asset modification data relating to any asset modifications relates to at least one of said step of applying by computer one or more properties previously applied to said comp comprises applying a property selected from the group of properties consisting of size, scale, non-linear scaling, rotation, transparency fill, application of object properties, and enveloping border.

10. The non-transitory tangible computer readable medium encoding a computer process for execution by a processor according to claim 7, wherein each first digital asset comprises at least one of a low resolution bit mapped asset, a thumbnail representing the asset, a watermarked thumbnail representing the asset, and a watermarked asset.

* * * * *